Dec. 15, 1925.  
W. F. MacGREGOR  
STRAW SPREADER  
Filed Oct. 6, 1924

1,565,379

2 Sheets-Sheet 1

INVENTOR.  
WALLACE F. MacGREGOR,  
BY James A. Walsh  
ATTORNEY

Dec. 15, 1925.
W. F. MacGREGOR
1,565,379
STRAW SPREADER
Filed Oct. 6, 1924   2 Sheets-Sheet 2
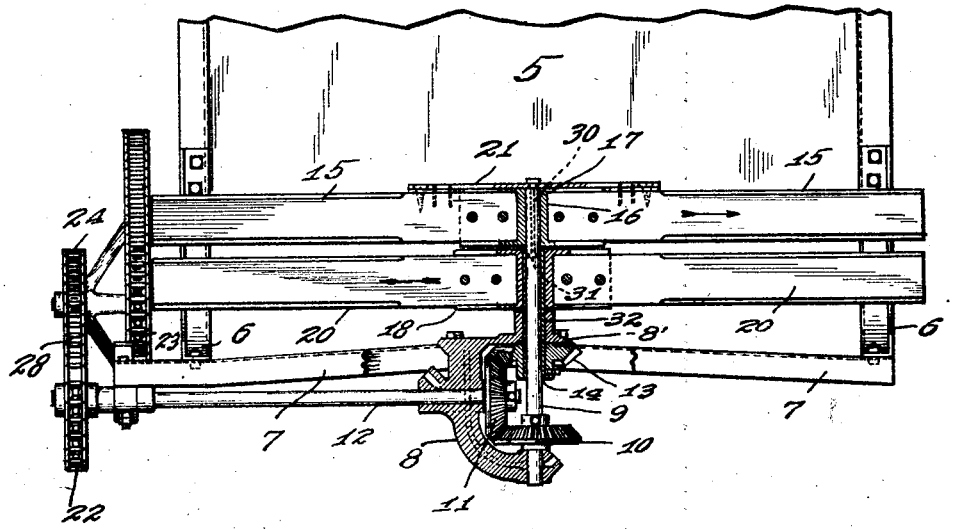
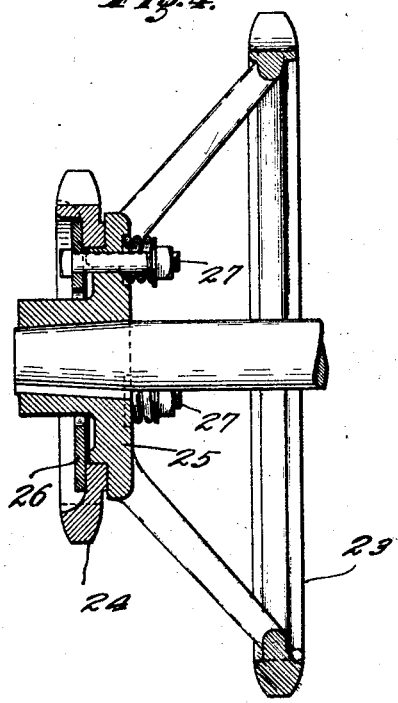
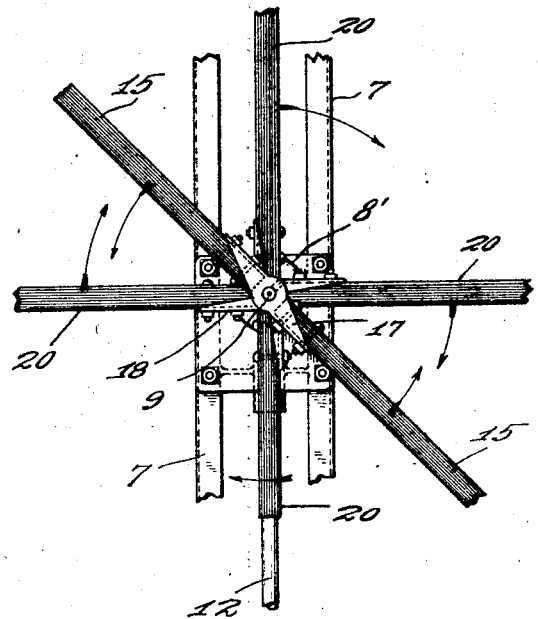
INVENTOR.
WALLACE F. MacGREGOR,
BY James A. Walsh
ATTORNEY.

Patented Dec. 15, 1925.

1,565,379

UNITED STATES PATENT OFFICE.

WALLACE F. MacGREGOR, OF RACINE, WISCONSIN, ASSIGNOR TO J. I. CASE THRESHING MACHINE COMPANY, OF RACINE, WISCONSIN, A CORPORATION.

STRAW SPREADER.

Application filed October 6, 1924. Serial No. 741,786.

*To all whom it may concern:*

Be it known that I, WALLACE F. MAC-GREGOR, a citizen of the United States, residing at Racine, in the county of Racine and State of Wisconsin, have invented certain new and useful Improvements in Straw Spreaders, of which the following is a specification.

In the operation of traveling threshing machines such for example of the character employed in combination harvester-threshers, standing grain in the field is cut and threshed, resulting in a constant discharge of straw from the rear of the thresher as it progresses. It is desirable to control such discharge of straw so that it will be distributed and spread in a uniform manner and thus be in suitable condition to be effectively plowed under and mixed with the soil when the latter operation becomes seasonable, and in which manner I provide uniform fertilization as the straw is widely scattered and spread and not strewn in strips as is common; and it is my object to provide a simple and efficient spreading device for the purpose, which I have demonstrated in field practice is capable of intercepting and separating straw discharging from the thresher and distributing and spreading it in the manner referred to, and which may be included as an element of the original thresher equipment or attached to such a machine already in use, as will hereinafter more particularly appear.

Figure 1:
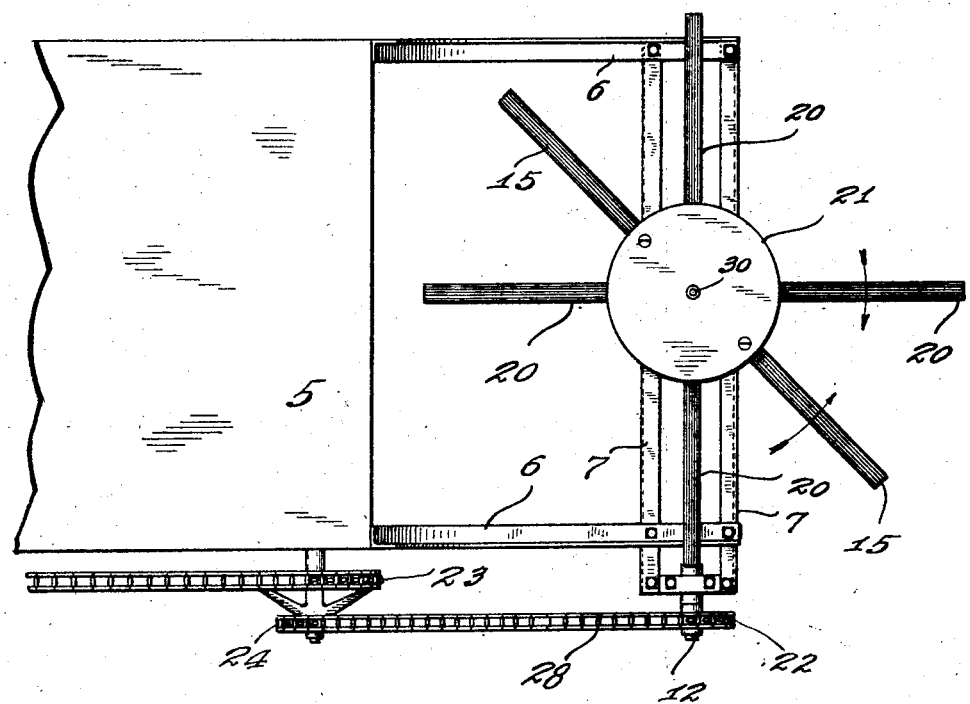
Figure 2:
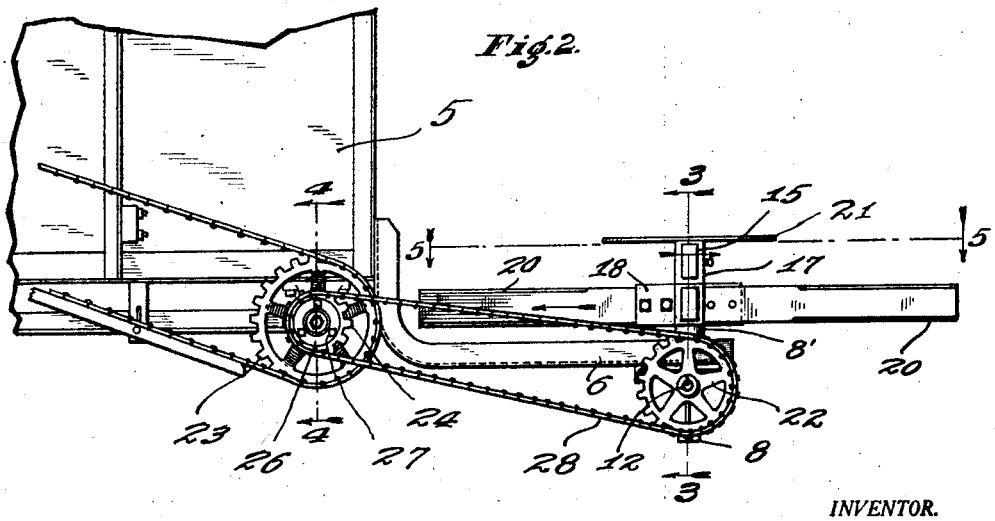

In the accompanying drawings, illustrating my invention and forming part hereof, Figure 1 is a plan of a thresher in fragment with my improved spreader attached thereto; Fig. 2 a side elevation of said parts; Fig. 3 a rear elevation taken on the dotted line 3—3 in Fig. 2; Fig. 4 an enlarged view partially in section on the dotted line 4—4 in Fig. 2 showing a clutch mechanism which I may employ, and Fig. 5 is a plan on the dotted line 5—5 in Fig. 2 showing spreading devices forming part of my improvement.

In said drawings, the portions marked 5 indicate the thresher to which is attached in any desired manner the spreader frame members, 6, composed of angle-iron or other construction and which are connected by one or more cross-members, 7. Supported by said frame is a shaft hanger, 8, embodying shaft bearings, 8' and 8", in which is mounted a vertical shaft, 9, having a gear, 10, thereon (Fig. 3) meshing with a vertical gear, 11, mounted upon a shaft, 12, supported in said hanger, 8, which latter gear 11 also meshes with a horizontal gear, 13, connected to sleeve, 14, on shaft, 9, the upper end of the latter having affixed thereto one or more arms or blades, 15, the arrangement shown comprising two arms secured to a collar, 16, embodying a keeper, 17, with which the arms are connected. Shaft 9 passes through the sleeve 14 supported in bearing 8', said sleeve also embodying a keeper, 18, for securing thereto a set of arms or blades, 20, the preferred arrangement being as indicated in Fig. 5, that is, one or more upper scattering arms 15 mounted to be driven in one direction, and a plurality of lower distributing arms or blades, 20, beneath said upper scattering arms driven in an opposite direction thereto, the upper side of arms 15 being preferably provided with a deflecting disk, 21.

Shaft 12 extends to one side of the spreader and is provided with a sprocket, 22. A thresher of the type illustrated is usually provided with a sprocket, 23, or equivalent driving element for operating certain of its mechanisms, and in order to utilize the same for driving the scattering arms 15 and 20 I so construct it as to readily attach thereto a clutch slip sprocket, 24, which is secured to flanged hub, 25, by a plate, 26, and spring-controlled bolts, 27. To said sprockets 24 and 22 I connect chain, 28, by which means the two sets of scattering arms are operated from the thresher, and in providing a clutch sprocket for the purpose it will be apparent that should any obstruction prevent rotation of the scattering arms, such as a stone or otherwise, such an occurrence will cause slip sprocket to disengage from hub 25 and run idly, thus stopping the operation of the scattering arms and constituting a safety device when such emergency arises. It will also be understood that when a thresher is to be equipped with a spreader the driving mechanism of the latter may be readily installed by attaching slip sprocket 24 to sprocket 23 for operation in the manner described.

By the arrangement described it will be seen that by the gear and sprocket system employed the upper scattering arms 15 and the lower scattering arms 20 are caused to travel in opposite directions, as indicated by the arrows in Fig. 5, with the result that as the straw from the thresher is being discharged into the path of the rotating spreader disk 21 and arms 15 they have the effect of separating and scattering the straw masses so that in this condition the lower scattering arms 20, rotating oppositely to the upper scattering arms, catch the loosened straw and discharge it rearwardly on the ground for the purpose stated, and while the plate 21 assists in deflecting the material it at the same time shields the shaft 9 and associated parts from dust and débris. In order to lubricate the spreader mechanisms the shaft 9 is provided with a longitudinal opening, 30, communicating with a cross opening, 34, in said shaft, and sleeve 14 is also provided with openings, 32, and oil injected into said opening 30 flows downwardly and passes through openings 31 and thence downwardly to openings 32, by which means said shaft 9 and associated parts are efficiently lubricated.

I claim as my invention:

1. In a spreader, a shaft, two sets of scattering arms mounted upon said shaft, and means for rotating said sets of scattering arms in opposite directions.

2. In a spreader, a shaft, a plurality of sets of scattering arms mounted on said shaft adjacent one another, the number of arms of one set being a multiple of the number of arms of the adjacent set, and means for rotating the adjacent sets of arms in opposite directions.

3. In a straw spreader, a frame, a shaft supported thereby, a sleeve on said shaft, a set of scattering arms fixed on said shaft, a set of scattering arms fixed on said sleeve, and means for rotating said sleeve and said shaft in opposite directions.

4. In a straw spreader, a frame, a vertical shaft supported thereby, an upper set of radial scattering arms mounted on said shaft, a lower set of radial scattering arms mounted on said shaft, the angular distance between the arms of the upper set being substantially greater than the angular distance between the arms of the lower set, and means for rotating said upper and lower sets of arms in opposite directions.

5. In a straw spreader, a frame, a vertical shaft supported thereby, a sleeve mounted upon said shaft, a set of horizontal scattering arms fixed on said sleeve, a second set of horizontal scattering arms fixed on said shaft above said sleeve, the number of scattering arms on said sleeve being a multiple of the number of arms on said shaft, and means for rotating said sleeve and said shaft in opposite directions.

6. In a straw spreader, a frame, a vertical shaft supported thereby, a circular deflector plate fixed to the top of said shaft, a set of horizontal scattering arms fixed upon said shaft beneath said plate and contiguous thereto, a sleeve mounted on said shaft beneath said arms, a set of horizontal scattering arms fixed on said sleeve, and means for rotating said sleeve and said shaft in opposite directions.

In testimony whereof I affix my signature.

WALLACE F. MacGREGOR.